United States Patent
Butterworth

(10) Patent No.: US 7,349,588 B2
(45) Date of Patent: Mar. 25, 2008

(54) AUTOMATIC METER READING

(75) Inventor: Mark Melvin Butterworth, Santa Clara, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 665 days.

(21) Appl. No.: 10/925,828

(22) Filed: Aug. 25, 2004

(65) Prior Publication Data

US 2006/0045389 A1    Mar. 2, 2006

(51) Int. Cl.
*G06K 7/10*    (2006.01)
(52) U.S. Cl. .................. 382/321; 382/198; 382/209
(58) Field of Classification Search ............... 382/209, 382/198, 274, 154; 345/424, 426, 420
See application file for complete search history.

(56) References Cited

U.S. PATENT DOCUMENTS

| 5,559,894 | A  | * | 9/1996 | Lubliner et al. ............ 382/100 |
| 5,729,008 | A  | * | 3/1998 | Blalock et al. .......... 250/208.1 |
| 6,233,368 | B1 | * | 5/2001 | Badyal et al. ............. 382/307 |
| 6,704,449 | B1 | * | 3/2004 | Ratner ........................ 382/176 |

OTHER PUBLICATIONS

Good research gone right: ABB develops a meter reader that mimics the human eye, available from: http://www.abb.com. 2004.

* cited by examiner

*Primary Examiner*—Samir Ahmed
*Assistant Examiner*—Stephen R Koziol

(57) ABSTRACT

A meter is read. An image on a face of the meter is captured. Optical character recognition of digits of a digital display on the face of the meter is performed. At least one stored template is used to perform the optical character recognition of digits.

20 Claims, 8 Drawing Sheets

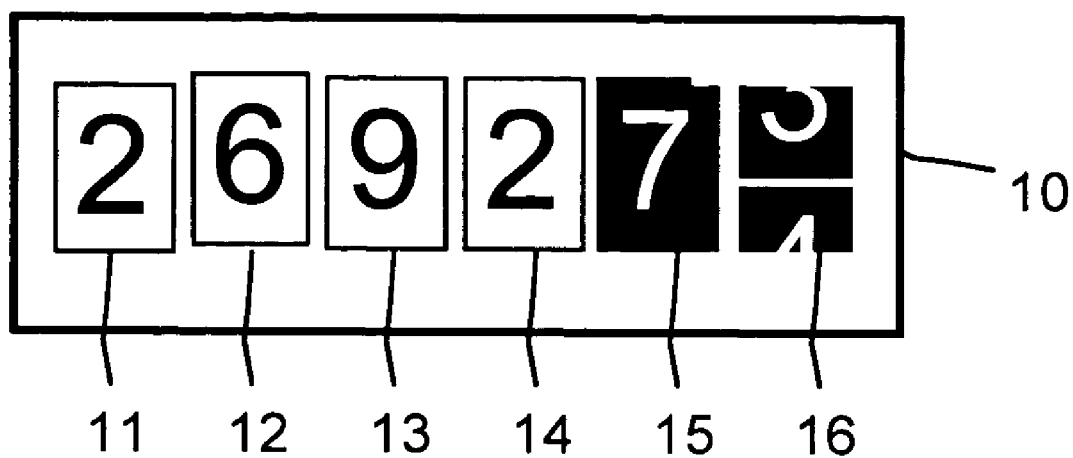
FIGURE 7

AUTOMATIC METER READING

BACKGROUND

Reading of meters, such as gas, electric and water meters, is often done manually. A meter reader typically needs to physically access and observe each meter to obtain a current meter reading.

SUMMARY OF THE INVENTION

In accordance with an embodiment of the present invention, a meter is read. An image on a face of the meter is captured. Optical character recognition of digits of a digital display on the face of the meter is performed. At least one stored template is used to perform the optical character recognition of digits.

BRIEF DESCRIPTION OF THE DRAWINGS

FIG. 7 and FIG. 8 illustrate correlation of digits in transitional positions in accordance with an embodiment of the present invention.

DESCRIPTION OF THE EMBODIMENT

Figure 1:
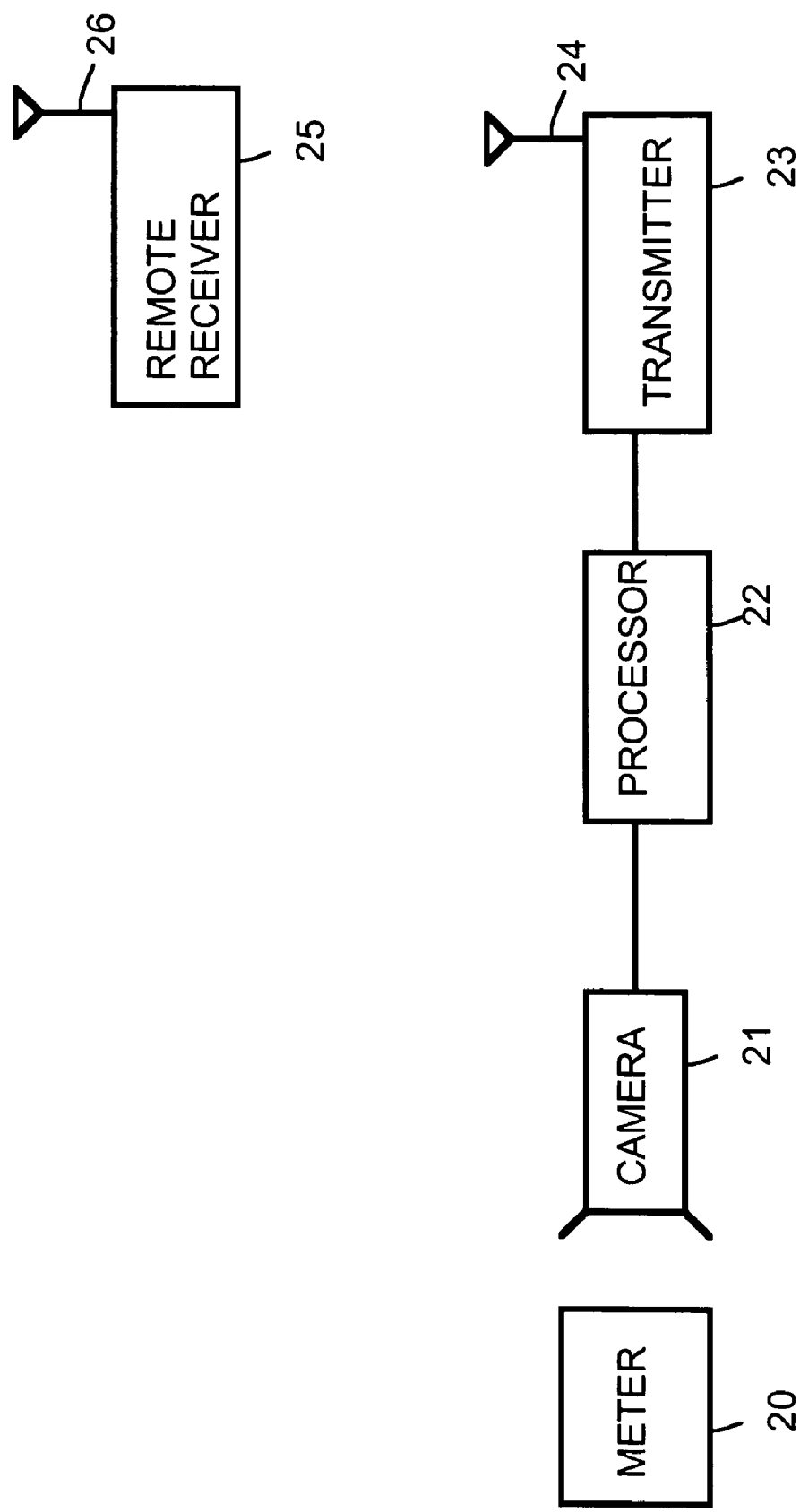
FIG. 1 shows an automatic meter reading system in accordance with an embodiment of the present invention.

FIG. 1 shows an automatic meter reading system. A camera 21 takes pictures of the face of a meter 20. For example meter 20 is a gas meter or a water meter. Camera 21 is, for example, a simple digital camera on a chip such as that used in a cell phone. Alternatively, camera 21 can be another type of digital camera or other type of camera.

A processor 22 receives digital images from camera 21 and performs optical character recognition (OCR) on digits displayed by wheels of meter 20. Processor 22 utilizes a transmitter 23 with an antenna 24 to transmit a detected and recognized numerical value to a remote receiver 25 that has an antenna 26.

For example processor 22 and camera 21 are adapted from hardware used to produce optical mice. For example, optical mouse hardware designed to perform a 26×26 pixel image correlation can be adapted to match a 26×26 pixel image of a digit displayed by meter 20 to 26×26 pixel templates of digits 0 through 9 to a larger template that includes multiple digits. For more information on optical mice hardware, see, for example, U.S. Pat. No. 6,233,368 and U.S. Pat. No. 5,729,008.

Figure 2:
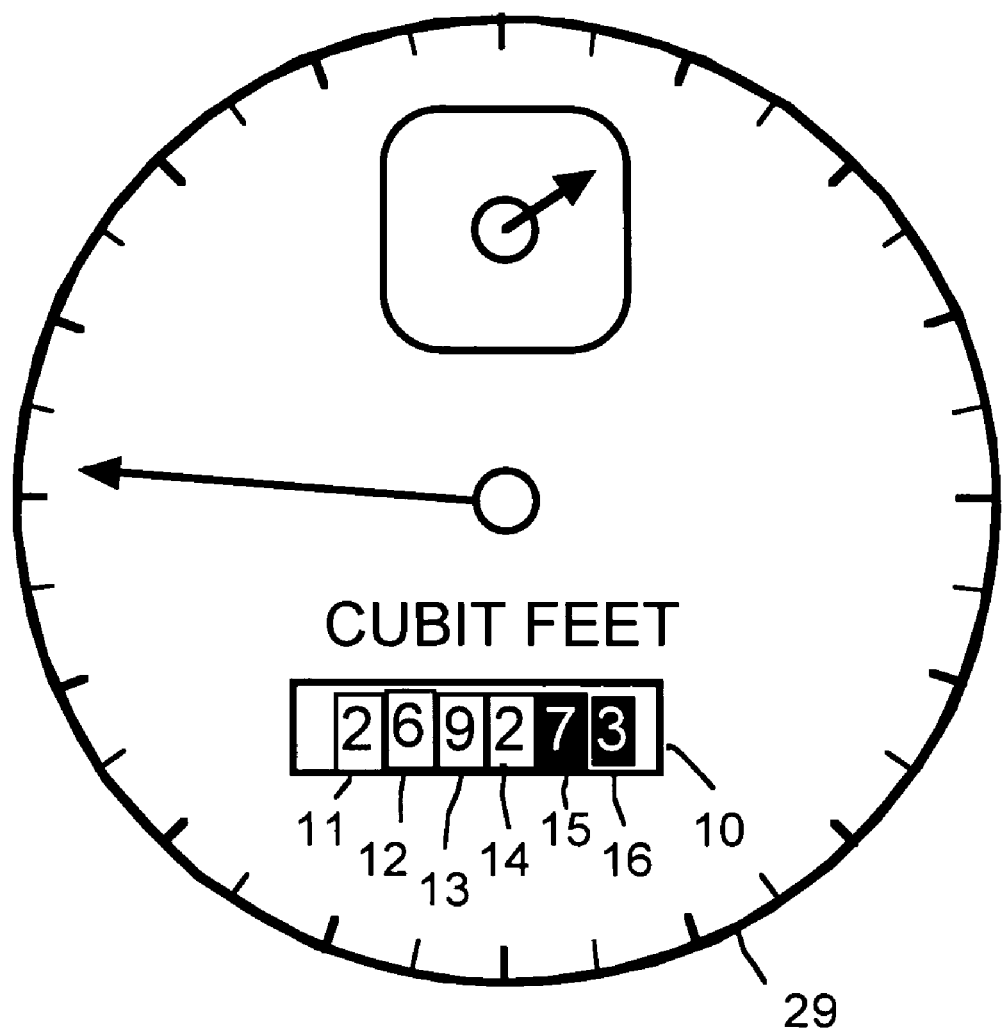
FIG. 2 shows an example of an image of a meter captured by a meter reading system in accordance with an embodiment of the present invention.

FIG. 2 shows an example of a face 29 of meter 20 as captured by camera 21. Face 29 of meter 20 includes a digital display 10. Digital display 10 is implemented, for example, by wheels that display digits. FIG. 2 shows digital display 10 including six wheels: a wheel 11, a wheel 12, a wheel 13, a wheel 14, a wheel 15 and a wheel 16.

Figure 3:
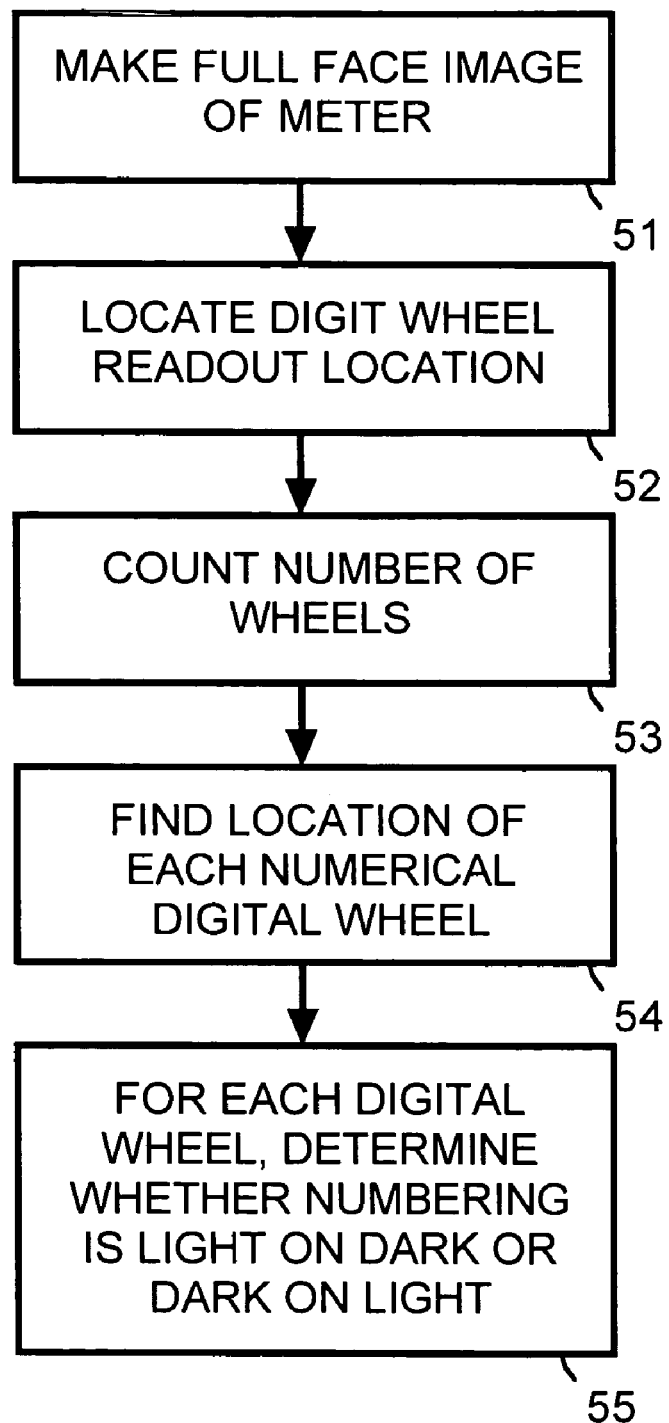
FIG. 3 is a simplified flowchart illustrating initialization of an automatic meter reading system in accordance with an embodiment of the present invention.

FIG. 3 is a simplified flowchart illustrating initialization of the automatic meter reading system shown in FIG. 1. In a block 51, a full face image of face 29 of meter 20 is captured. In a block 52, digital display 10 is located. This is done, for example, by pattern matching of locations on the captured image of meter 20 with a pattern typical of a digital display of a meter.

In a block 53, the number of wheels within digital display 10 is determined. This is done, for example, by pattern matching of locations of digital display 10 with patterns typical of wheels in various positions. In a block 54, the location for each wheel is found. This is done, for example, based on the pattern matching of locations of digital display 10 with patterns typical of wheels in various positions. In a block 55, for each wheel, a determination is made as to whether numbers on the wheel are light on dark (e.g., white on black) or are dark on white (e.g., black on white). Again pattern matching is used to make this determination.

Figure 4:
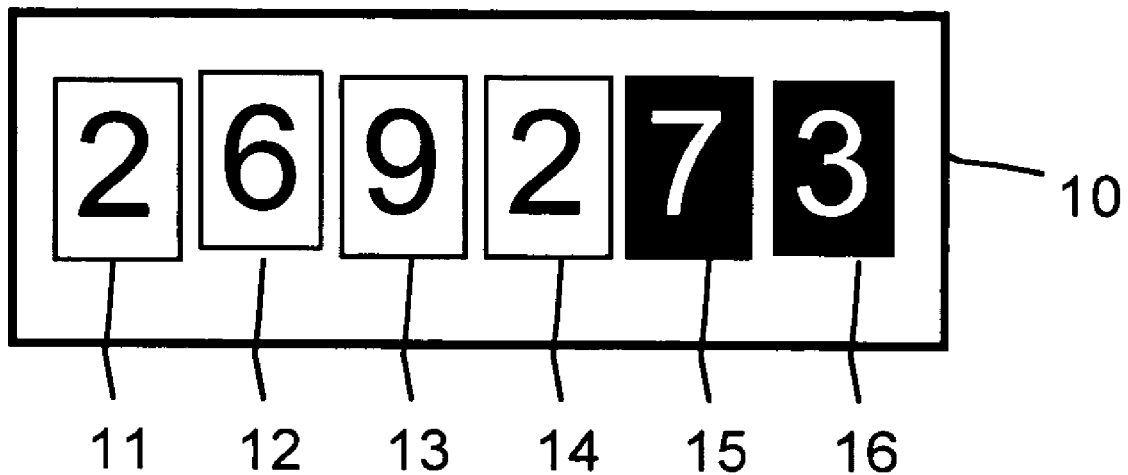
FIG. 4 shows an example of an image of digital information displayed by a meter and captured by a meter reading system in accordance with an embodiment of the present invention.

FIG. 4 shows the portion of face 29 of meter 20 that is utilized after initialization to determine the value displayed by meter 20. Specifically, digital values displayed by wheels 11, 12, 13, 14, 15 and 16 of digital display 10 are recognized to obtain a reading of meter 20.

Figure 5:
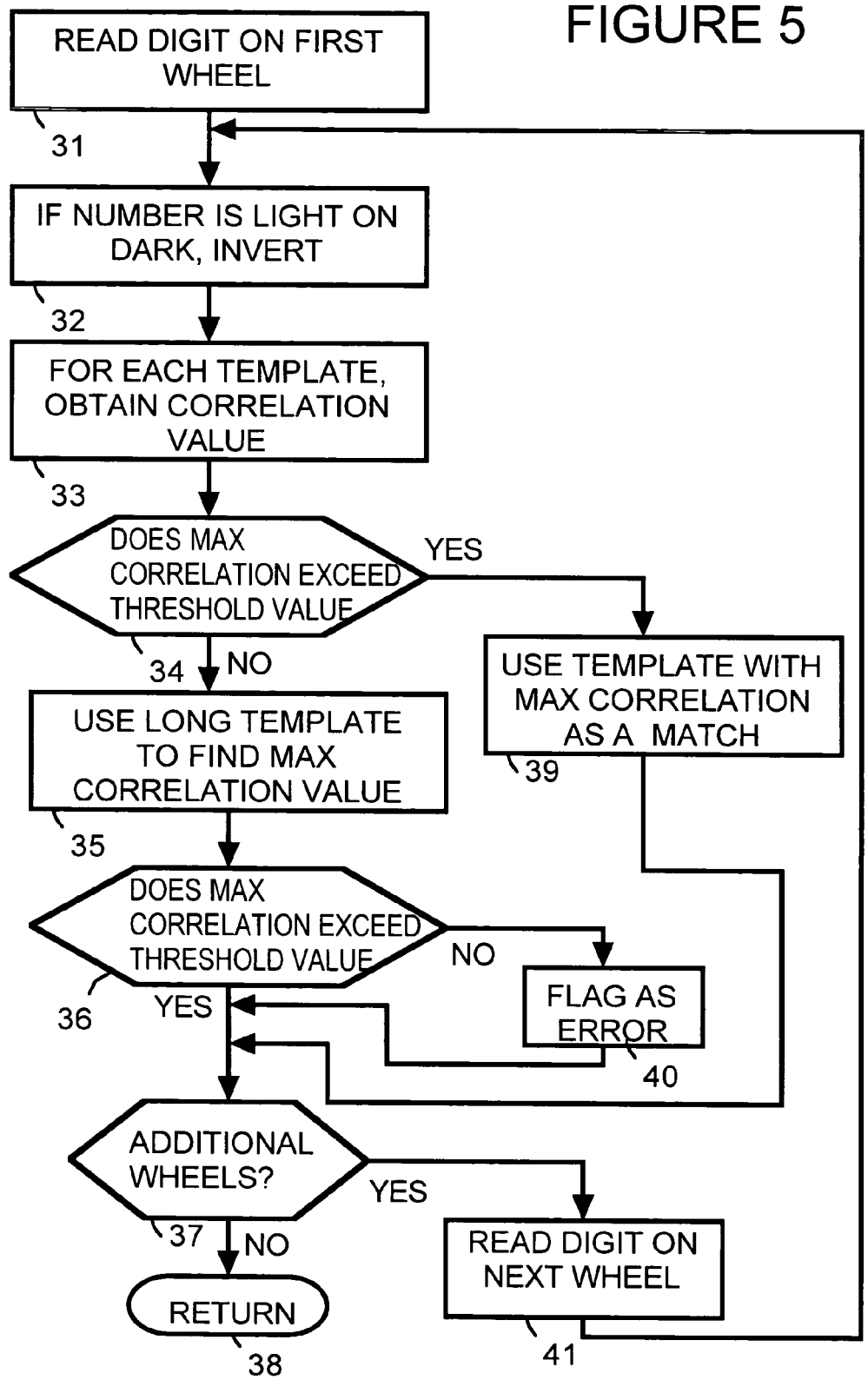
FIG. 5 is a simplified flowchart illustrating operation of an automatic meter reading system in accordance with an embodiment of the present invention.

FIG. 5 is a simplified flowchart illustrating operation of an automatic meter reading system when a reading is obtained. Readings may be taken at any chosen interval. For example, readings can be taken hourly or more frequently than hourly. Alternatively, readings can be taken monthly or less frequently than monthly. Or readings can taken at a frequency greater than hourly and less than monthly.

When a reading is taken, in a block 31, digital display 10 is captured by camera 21 (shown in FIG. 1). In a block 31, the digit for the first wheel is read. For example the first wheel is wheel 11 shown in FIG. 4.

Figure 6:
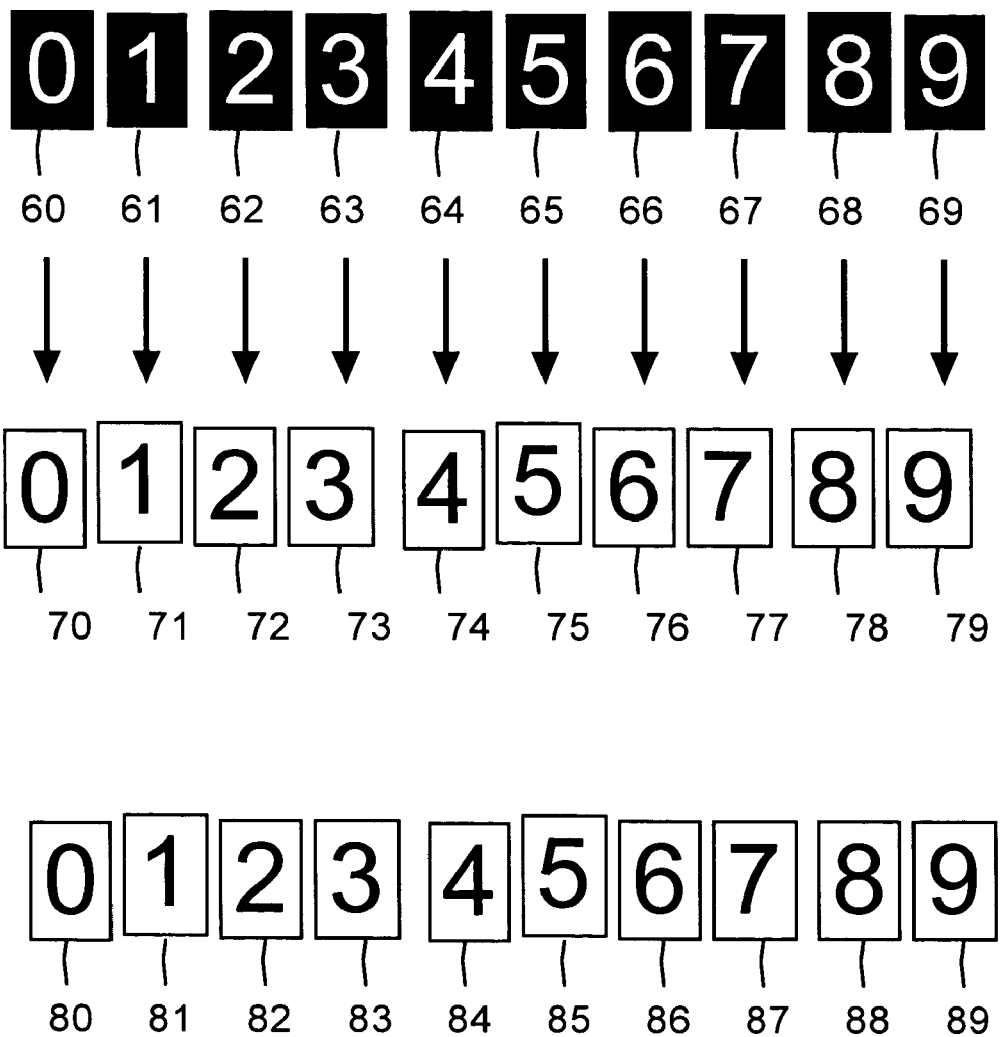
FIG. 6 illustrates inversion and correlation of digits of numerical information displayed by a meter and captured by a meter reading system in accordance with an embodiment of the present invention.

In a block 32, if the number is light on dark (e.g., white on black), processor 22 inverts the number. This is illustrated in FIG. 6. In FIG. 6, a digit 60 is a light on dark representation of the digit "0". When inverted, digit 60 becomes a dark on light representation of the digit "0" as illustrated by digit 70. A digit 61 is a light on dark representation of the digit "1". When inverted, digit 61 becomes a dark on light representation of the digit "1" as illustrated by digit 71. A digit 62 is a light on dark representation of the digit "2". When inverted, digit 62 becomes a dark on light representation of the digit "2" as illustrated by digit 72. A digit 63 is a light on dark representation of the digit "3". When inverted, digit 63 becomes a dark on light representation of the digit "3" as illustrated by digit 73. A digit 64 is a light on dark representation of the digit "4". When inverted, digit 64 becomes a dark on light representation of the digit "4" as illustrated by digit 74. A digit 65 is a light on dark representation of the digit "5". When inverted, digit 65 becomes a dark on light representation of the digit "5" as illustrated by digit 75. A digit 66 is a light on dark representation of the digit "6". When inverted, digit 66 becomes a dark on light representation of the digit "6" as illustrated by digit 76. A digit 67 is a light on dark representation of the digit "7". When inverted, digit 67 becomes a dark on light representation of the digit "7" as illustrated by digit 77. A digit 68 is a light on dark representation of the digit "8". When inverted, digit 68 becomes a dark on light representation of the digit "8" as illustrated by digit 78. A digit 69 is a light on dark representation of the digit "9". When inverted, digit 69 becomes a dark on light representation of the digit "9" as illustrated by digit 79.

In a block 33, shown in FIG. 5, a correlation value is found for each template. For example, FIG. 6 shows a template 80 for the digit "0", a template 81 for the digit "1", a template 82 for the digit "2", a template 83 for the digit "3", a template 84 for the digit "4", a template 85 for the digit "5", a template 86 for the digit "6", a template 87 for the digit "7", a template 88 for the digit "8" and a template 89 for the digit "9".

In a block 34, shown in FIG. 5, a check is made to determine if the maximum correlation value exceeds a predetermined threshold. If the maximum correlation value exceeds a predetermined threshold, in a block 39, the template with the maximum correlation value is considered a match and the digit is recognized as having the value of the template with the maximum correlation value.

If in block 34 the maximum correlation value does not exceed a predetermined threshold, in a block 35, a long template is used to find the maximum correlation value.

FIG. 7 illustrates why in block 34, the maximum correlation value may not exceed a predetermined threshold. As shown in FIG. 7, wheel 16 of digital display 10 is at a position between two digits, the number 3 and the number 4. When inverted, the display for wheel 16 appears as shown by a "3/4" display 91 shown in FIG. 7.

Figure 8:
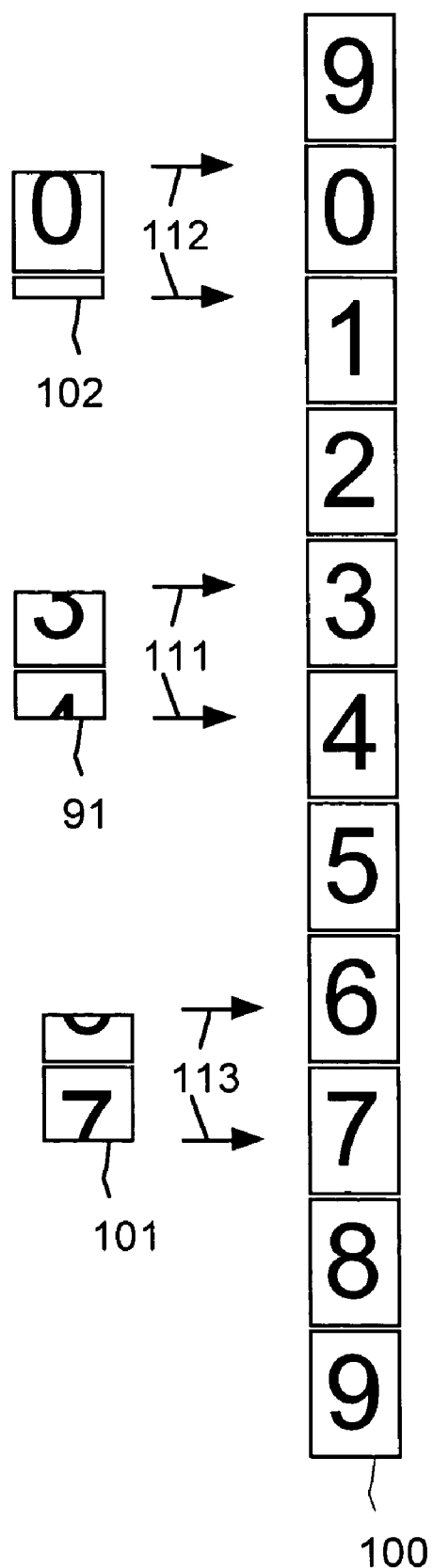

FIG. 8 shows a long template 100 used in block 35 to find the maximum correlation value. Arrows 111 show where the maximum correlation between "3/4" display 91 will occur on long template 100. This location of maximum correlation will indicate to processor 22 that wheel 16 is transitioning between the digit "3" and the digit "4". Arrows 112 show where a maximum correlation between a "0/1" display 102 will occur on long template 100. This location of maximum correlation will indicate to processor 22 that a wheel is transitioning between the digit "0" and the digit "1". Arrows 113 show where a maximum correlation between a "6/7" display 101 will occur on long template 100. This location of maximum correlation will indicate to processor 22 that a wheel is transitioning between the digit "6" and the digit "7".

In a block 36, shown in FIG. 5, a check is made to determine if the maximum correlation value exceeds a predetermined threshold. If the maximum correlation value does not exceed a predetermined threshold, in a block 40, an error is flagged.

In a block 37, a check is made to see whether there are additional wheels. If in block 37 there are additional wheels, in a block 41, a digit for the next wheel is read. For example, if wheel 11 was the last wheel read, the next wheel is wheel 12. The recognition process, beginning at block 32, is repeated for this next read wheel.

If in block 37 there are no additional wheels to be read, in a block 38, the process is completed and returns.

In alterative embodiments, character recognition can be performed with different processes. For example, instead of inverting light on dark digits (as in block 32), dark on light digits can be inverted and corresponding templates can be used. Alternatively, instead of inverting light on dark digits, no inversion is performed and double the number of templates are used with templates with light on dark digits being used in addition to templates with dark on light digits. Likewise the order in which wheels are processed can be changed. Also, in an alternative embodiment, the long template can be used for all character recognition without using separate digit templates.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for reading a meter comprising wheels that rotatably display digits, the method comprising:
   capturing an image of a face of the meter; and,
   performing optical character recognition using at least one template in order to recognize digits displayed on the wheels of the meter.

2. A method as in claim 1 wherein performing optical character recognition of digits includes inverting digits that are light into digits that are dark.

3. A method as in claim 1 wherein the at least one template comprises a long template for recognizing a combination of digits comprising a portion of a first digit on a first wheel and a portion of a second digit on a second wheel.

4. A method as in claim 3 wherein the long template is additionally used for recognizing an entire digit on a single wheel.

5. A method as in claim 1 wherein the at least one template comprises a plurality of templates, each of the plurality of templates including a single digit, and a long template with multiple digits, the long template being used to recognize digits in transition.

6. A method as in claim 1 additionally comprising:
   transmitting results of the optical character recognition to a remote location.

7. A system for reading a meter comprising wheels that rotatably display digits, the system comprising:
   a camera that captures an image of a face of the meter; and,
   a processor that performs optical character recognition using at least one template to perform the optical character recognition of digits displayed on the wheels of the meter.

8. A system as in claim 7 wherein before performing optical character recognition of digits the processor inverts digits that are light into digits that are dark.

9. A system as in claim 7 wherein the at least one template comprises a long template for recognizing a combination of digits comprising a portion of a first digit on a first wheel and a portion of a second digit on a second wheel.

10. A system as in claim 9 wherein the long template is additionally used for recognizing an entire digit on a single wheel.

11. A system as in claim 7 wherein the at least one template comprises a plurality of templates, each of the plurality of templates including a single digit, and comprises a long template with multiple digits, the long template being used to recognize digits in transition.

12. A system as in claim 7 additionally comprising:
   a transmitter that transmits results of the optical character recognition to a remote location.

13. A method as in claim 1 wherein using the at least one template comprises:
   using the at least one template for performing a first optical character recognition of digits displayed on the wheels of the meter, the at least one template configured for recognizing light digits on dark backgrounds;

inverting the image for converting light to dark and dark to light; and using the at least one template for performing a second optical character recognition on the inverted image, wherein performing the first and second optical character recognition provides optical character recognition of a combination of light digits on dark backgrounds and dark digits on light backgrounds.

14. A method as in claim 1 wherein using the at least one template comprises:

using a first template for performing a first optical character recognition of digits displayed on the wheels of the meter, the first template configured for recognizing light digits on dark backgrounds; and using a second template for performing a second optical character recognition of digits displayed on the wheels of the meter, the second template configured for recognizing dark digits on light backgrounds, wherein using the first and second templates provides optical character recognition of a combination of light digits on dark backgrounds and dark digits on light backgrounds.

15. A method as in claim 1 wherein performing optical character recognition of digits on the wheels of the meter are carried out in at least one of a) a first order in which wheels are processed or b) a second order in which wheels are processed, wherein the first order is different than the second order.

16. A method for reading a meter, the method comprising:

capturing an image of at least a portion of a face of the meter;

determining from the image, the number of wheels present in the meter, wherein each wheel displays a digit of a digital readout of the meter; and performing optical character recognition of a first portion of the digital readout comprising dark digits on a light background; and performing optical character recognition of a second portion of the digital readout comprising light digits on a dark background.

17. A method as in claim 16 wherein performing optical character recognition of the first portion of the digital readout comprises using a first template; and performing optical character recognition of the second portion of the digital readout comprises using a second template that is different than the first template.

18. A method as in claim 17 wherein at least one of the first or the second templates is a long template for recognizing a combination of digits comprising a portion of a first digit on a first wheel and a portion of a second digit on a second wheel.

19. A method as in claim 16 wherein performing optical character recognition of the first portion of the digital readout comprises using a first template; wherein the second portion comprises an inverted image of the first portion, and performing optical character recognition of the second portion of the digital readout comprises using the first template upon the second portion.

20. A method as in claim 19 further comprising using a long template, wherein the long template is configured for recognizing a combination of digits that includes a portion of a first digit on a first wheel and a portion of a second digit on a second wheel.

* * * * *